W. FRITZ.
BEARING.
APPLICATION FILED MAR. 25, 1912.
1,095,839.
Patented May 5, 1914.
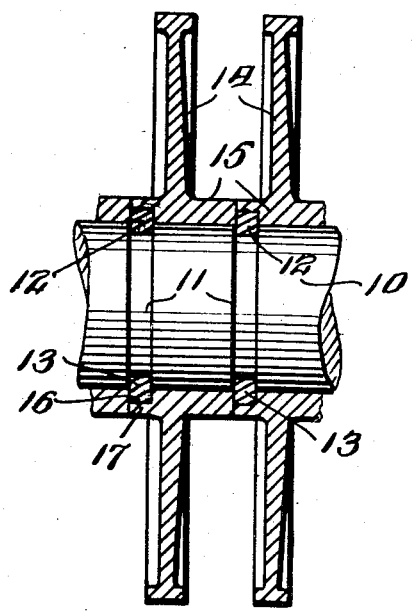
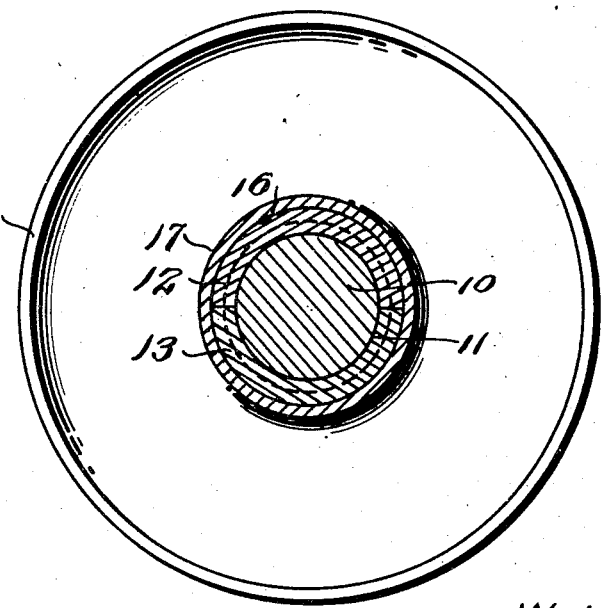
Witnesses
Walter Fritz, Inventor
By Mason Fenwick & Lawrence
Attorneys

UNITED STATES PATENT OFFICE.

WALTER FRITZ, OF BERLIN, GERMANY, ASSIGNOR TO BERGMANN-ELEKTRICITÄTS-WERKE, OF BERLIN, GERMANY, A CORPORATION.

BEARING.

1,095,839.   Specification of Letters Patent.   Patented May 5, 1914.

Application filed March 25, 1912. Serial No. 686,115.

*To all whom it may concern:*

Be it known that I, WALTER FRITZ, a subject of the Emperor of Germany, residing at Berlin, in the Empire of Germany, have invented certain new and useful Improvements in Bearings; and I do hereby declare the following to be a full, clear, and exact description of the invention, such as will enable others skilled in the art to which it appertains to make and use the same.

My invention relates to means for properly spacing several rotors on a single shaft and has for an object to provide means for accurately and positively securing several independent rotors upon a shaft without contact or friction against one another.

Another object is to provide means for mounting several wheels as in a turbine so that each wheel is in its proper place and no movement along said shaft is possible as resultant from wear or improperly assembling.

Other objects will be apparent from the following specification, appended claim and drawings in which:—

Figure 1 is a sectional view of my construction. Fig. 2 is a section transversely through the shaft showing one of the wheels in elevation.

In the construction of turbines, pumps and the like it is frequently necessary that several wheels be mounted upon the same shaft and that said wheels assume the proper position thereon. In setting up a device where the hubs bear against one another and the end hubs bear against a fixed collar, any displacement of one wheel will throw the others out of alinement so in order to avoid such a contingency I provide a shaft 10 with annular grooves 11 which are spaced at proper intervals. Split rings comprising the members 12 and 13 are adapted to fit in said grooves and in building up a unit, a wheel 14 is mounted on the shaft and the hub 15 is cut out at 16 to form a flange 17 which envelops the members 12 and 13 to prevent displacement, then the second pair of members 12 and 13 are placed in position and the second wheel applied. This method of building up a unit may be repeated until the desired size and proportions are obtained.

The operation of the device is obvious from the foregoing and

Having thus described my invention, I claim:—

In a device of the class described, a shaft having annular grooves formed thereon, a plurality of wheels each having hubs with one face plane and disposed at an angle with the wall of the bore of the hub, the opposite face provided with a bore concentric with the bore of the hub proper, and of greater diameter, forming a shoulder adapted to coincide with one of the walls of a given groove, the other wall of said groove being in line with the adjacent face of the hub said face being adapted to abut the opposite face of an adjacent hub and form an annular inclosed chamber between each two hubs, and an annular member within the chamber engaging the shaft and resting against the plane face of one hub and disposed within the larger bore.

In testimony whereof I affix my signature in presence of two witnesses.

WALTER FRITZ.

Witnesses:
  HENRY HASPER,
  WOLDEMAR HAUPT.